Feb. 14, 1933.   H. A. WADMAN   1,897,973
METHOD OF AND APPARATUS FOR MELTING GLASS
Filed May 6, 1930

Witness:
G. A. Duberg

Inventor;
Harold A. Wadman
by Brown & Graham
Attorneys.

UNITED STATES PATENT OFFICE

HAROLD A. WADMAN, OF HARTFORD, CONNECTICUT, ASSIGNOR TO HARTFORD-EMPIRE COMPANY, OF HARTFORD, CONNECTICUT, A CORPORATION OF DELAWARE

METHOD OF AND APPARATUS FOR MELTING GLASS

Application filed May 6, 1930. Serial No. 450,071.

This invention relates to a method of and apparatus for melting glass by the use of electricity, and relates more particularly to a new method for starting such an operation and to apparatus to be used in connection with such a method.

In melting glass by passing a current of electricity therethrough, it has been found that for various reasons the most satisfactory electrodes are those made of graphite. These present the inherent disadvantage of oxidizing at the temperature of molten glass if they are in contact with air. The oxidation results in a discoloration of the glass and makes it unsuitable for many uses as well as the burning of the electrodes and consequent reduction in size thereof, which is harmful.

Since glass is a conductor of electricity only when heated, the problem of starting the operation of an electrically operated tank in which glass is itself used as a resistor is presented. Either cullet must be melted in place between the electrodes by supplemental heating means to heat it to a temperature at which it will conduct a current or else molten glass must be poured into the tank to form a connection between the electrodes. With the apparatus now in use the first method allows oxidation of the electrodes due to the fact that a quantity of air is incorporated in the cullet and considerable time must elapse before the cullet is so fused that it will preclude the admission of air to the electrodes while at the same time the temperature is sufficiently high to oxidize the electrodes. The second method allows oxidation primarily due to the construction of the tank which is usually of such size for practical use that considerable time must elapse before sufficient glass can be ladled into the tank to make the depth of the glass therein sufficient to cover the electrodes. It follows that in order to manufacture glass which is free of the discoloration caused by the oxidation of the electrodes, much glass must be gradually withdrawn and its place taken with batch or cullet which is melted in its place.

This process must continue gradually until the discoloration of the glass in the tank has been reduced to the point where it is negligible. It is, of course, under this procedure theoretically impossible to eliminate all discolorations from the glass, and as a practical matter the expense of proceeding in this way, due to the large quantities of glass which must be withdrawn and the length of time which it takes to supply additional batch or cullet to the glass in the tank while keeping the electrodes entirely submerged and drawing off the discolored glass, is so great as to make it relatively worthless.

In the melting of glass there are found frequently varying temperatures at any given section thereof. This results in glass having undesirable characteristics being taken from the tank at the outlet. It is, therefore, often highly desirable to move the electrodes vertically within the furnace in order to change the path through which the current passes and to thus compensate for variations in the temperatures of various portions of a given section. The most satisfactory way of doing this is to support the electrode from the top of the tank and thus the stem of the electrode is from time to time moved to various depths in the bath of glass. It is, therefore, desirable in order to preclude the oxidation of the stem at the glass line to protect it from contact with the air. In order to do this, I have therefore devised a new type of protected electrode.

An object of this invention is to provide a method of melting glass whereby the wastage previously occurring in the production of uncolored glass heretofore used may be avoided.

Another object is to provide a glass melting tank for carrying out the above-mentioned method.

Another object is to provide an electrode which may be moved vertically within the furnace and all portions of which may be protected against oxidation when at the glass line.

A more specific object of my invention is to provide a method of starting the operation of a glass melting tank in which oxidation of the electrodes will be prevented and thus the discoloration of glass caused by such oxidation eliminated.

Still another object of my invention is to provide an electrode which will be maintained at all times out of contact with air in such places and at such temperatures as would cause the oxidation thereof.

Referring to the drawing.

Figure 1:
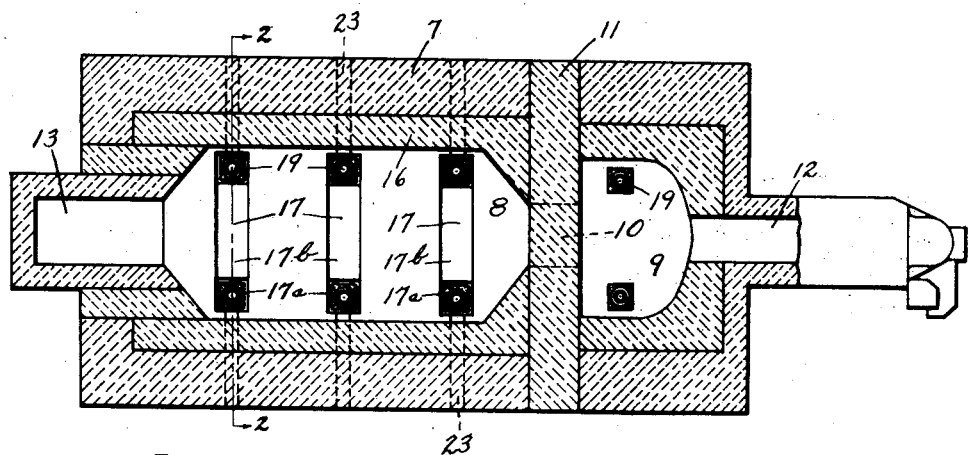
Figure 1 is a horizontal sectional view showing a glass melting tank embodying my invention.

Referring particularly to Fig. 1, a glass melting tank is designated as 7. The tank is composed of a melting portion 8 to which is connected a refining portion 9 by means of a submerged throat 10 formed in a bridge wall 11, the tank having at its forward end a glass feeding forehearth 12. At the opposite end of the tank is indicated diagrammatically a dog house 13.

Figure 2:
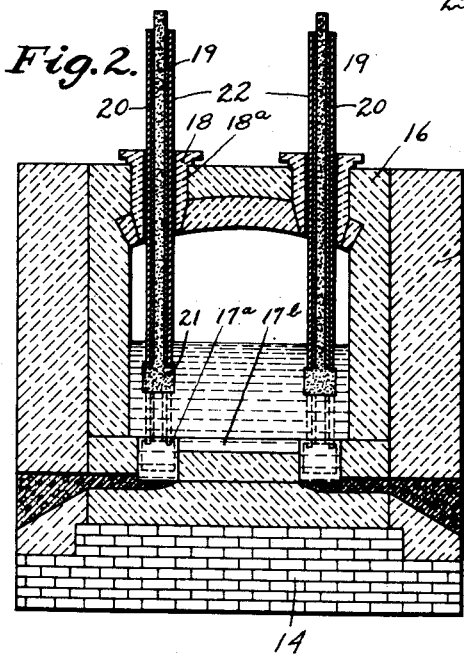
Fig. 2 is a vertical sectional view taken on the lines 2—2 of Fig. 1.

Referring now to Figs. 1 and 2, resting upon a foundation indicated as composed of common bricks 14 is a structure of insulating bricks 15 lined upon its interior with a layer of highly heat resistant refractory brick 16, such, for instance, as those disclosed in the United States Letters Patent of Paul G. Willetts, No. 1,605,885, patented Nov. 2, 1926. This structure defines the boundaries of the glass melting tank 8. In the bottom of the melting tank are a plurality of wells 17 extending substantially across the tank. These, as shown in Fig. 2, comprise two deep portions 17a and a portion of lesser depth 17b connecting the two.

Centered over the deep portions of the wells 17 are openings 18a in the roof of the tank. These openings are provided with refractory bushings 18 through which extend electrodes 19 composed of carboniferous material, such as graphite. These electrodes preferably are cylindrical in shape except for their lower ends which are enlarged to form heads 21 having relatively large glass contacting surfaces. The openings 18a are larger in diameter than the heads 21 of the electrodes so that the electrodes may be readily withdrawn from the tank. Surrounding the cylindrical portion of each electrode is a refractory covering or electrode holder 22 which is of a material similar to the refractory brick 16. The holders 22 have a sliding fit with the bushings 18. These coverings fit into groves in the heads 21 of the electrodes. The cavities between the coverings 22 and the stems of the electrodes 19 are filled as found convenient either as shown with glass 20 or with a non-oxidizing gas. If the latter, the top of the holder must be sealed against the stem of the electrode. If glass is used, no sealing is necessary as the glass above the furnace will be insufficiently heated to be in other than a solid state.

At the bottom of each of the deeper portions 17a of the wells 17 is provided an outlet 23 through which the tank may be drained. These are shown as filled with a heat resistant granular substance 24 which acts as a plug to prevent the escape of glass. Obviously other forms of plugs may be used.

Figure 3:
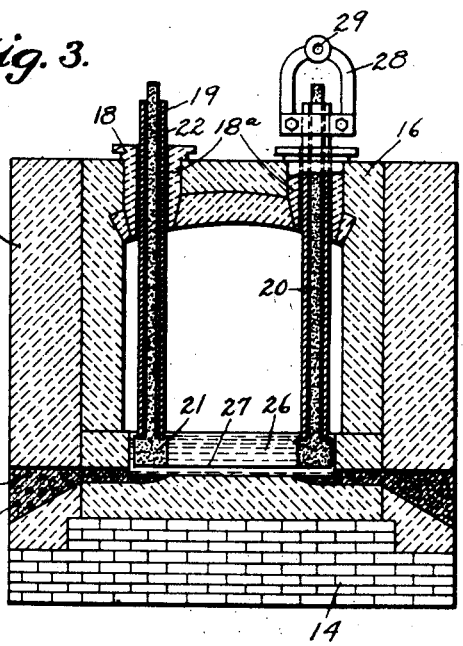
Fig. 3 is a view similar to Fig. 2, but showing another embodiment of my invention.

In the embodiment of my invention shown in Fig. 3, the shallow portion 17b shown in the well 17 in Fig. 2 is eliminated, and the well 26 (Fig. 3) is of uniform depth, this depth being sufficient to cover the heads 21 of the electrodes 19. A resistor 27 of material which constitutes a conductor at all temperatures, as for example nichrome, is shown in place in the bottom of the well between the two electrodes. A holder 28 is indicated as attached to the upper end of one of the electrodes 19, and is provided with an opening 29 therein to provide means for attaching it to a chain or other positioning means. The electrodes obviously may be counterbalanced and lifted by any desired means.

With the above-described apparatus, new methods of operation suitable to the heating facilities available are possible. The preferred method which may be used where both electricity and an auxiliary heating means are found is to use a tank of the type of construction shown in Fig. 2. With the electrodes 19 and the blocks 18 withdrawn from the openings 18a, the wells 17 are heated with portable gas or oil burners which are inserted through the openings. Due to the relatively small size of the wells as compared with the tank and the comparatively small amounts of glass which may be contained therein, it is possible to raise the temperature thereof to that suitable for melting glass within a short time. If a supply of molten glass is available this may be poured into the heated wells. If a supply of molten glass is not available glass-forming cullet may be placed in the wells and melted by the use of the auxiliary heating means. In either case the auxiliary heating means is withdrawn and the blocks 18 and electrodes 19 replaced in the openings and the current turned on, care being taken to totally submerge the heads of the electrodes.

By the use of this method and the type of electrode disclosed above, it will be noted that the electrodes are only momentarily in contact with the glass and air while they are being submerged. Thus any discoloration of the glass due to oxidation of the electrodes is avoided. With the electrodes submerged further glass-making cullet or batch may be added to the tank through the doghouse and the level of glass in the tank gradually raised to the operative level.

If auxiliary heating means are not available, it is preferred to use the type of tank shown in Fig. 3. In such a tank a nichrome resistance element may be inserted between the heads of the electrodes, the walls and bottom of the well heated by passing current through the resistance element, the resistance element taken out, and glass having a low fusible point, such as water-glass or sodium silicate, may be introduced to fill a well. Thus the heads of the electrodes are again submerged without much, if any, oxidation thereof. More lime or other materials can be added to the molten glass as the temperature is raised to bring the molten glass to the desired consistency. The process may then continue as in the first described method.

Optionally a resistance having a low melting point may be inserted in place of the nichrome resistance element and withdrawn through the openings 23 after a supply of glass has been added to submerge the electrodes.

It is obvious that the material of the melted resistors and/or any discolored glass which may form in the wells may readily be withdrawn through the openings 23 and fresh glass simultaneously added to maintain the electrodes submerged and to wash out the wells with comparatively little waste of glass or time. Thus clean glass may be readily obtained without the loss of the large quantities of glass which occurred in the methods heretofore used.

After the melting operations have been started by any of the above methods, I preferably raise the electrodes as indicated in Fig. 2 to suitable points to obtain the most effective uniform heating of the glass batch. As indicated, this movement of the electrodes is readily accomplished by the means 28 and 29 provided, and this arrangement enables me not only to initially locate the electrodes at a particular depth but permits a regulation of the position of the electrodes in the bath to correct any improper conditions developing in the several vertical strata of the batch.

During the operation, when one layer of the batch should tend to cool excessively, the heads of the electrodes may be moved directly into that layer, thus shortening the path of the current therethrough and intensifying the heating effect therein.

It is obvious that many departures may be made from the above illustrated embodiments of my invention without departing from the spirit and scope thereof as set forth in the following claims:

I claim as my invention:

1. A glass melting furnace comprising a floor, wells in the floor for containing a relatively small amount of glass as compared with the capacity of the furnace, adjustable electrodes in alignment with said wells, means for lowering the electrodes into the wells, and means for supplying a current of electricity to the electrodes and through said glass while in said wells, whereby the starting of the furnace with a relatively small amount of molten glass is facilitated.

2. A glass melting furnace comprising a floor, wells in the floor for containing a relatively small amount of glass as compared with the capacity of the furnace, adjustable electrodes in alignment with said wells, means for lowering the electrodes into the wells, and means to pass a current of electricity between the electrodes while in said wells, whereby the starting of the furnace with a relatively small amount of molten glass is facilitated.

3. A glass melting furnace comprising a floor, wells in said floor for containing a relatively small amount of glass as compared with the capacity of the furnace, electrodes in said wells, and means to pass the current of electricity between said electrodes beneath the plane of said floor, whereby the starting of the furnace with a relatively small amount of molten glass is facilitated.

4. A glass melting tank comprising a container for glass-forming materials, a second container for glass-forming materials within the first container, means for heating the second container, means for withdrawing the heating means, and a second heating means for heating both containers and their contents whereby a relatively small amount of glass may be initially heated in said second container prior to the initiation of larger scale melting operations in the first-named container.

5. A glass melting tank comprising a container for glass-forming materials, a plurality of containers for glass-forming materials within the first container, means for heating each of the plurality of containers, means for withdrawing the heating means, and a second heating means for heating all of the containers and their contents, whereby small scale glass melting operations may be carried on in said plurality of containers prior to the initiation of larger scale melting operations in all said containers.

6. A glass melting tank comprising a container for glass-forming materials, a plurality of containers for glass-forming materials within the first container, individually controllable means for heating each of the plurality of containers, and means for withdrawing glass from each of the plurality of containers, whereby small scale glass melting operations may be carried on in said plurality of containers in starting the operation of the tank to facilitate the initiation of larger scale operations in the first named container and whereby small quantities of relatively impure glass produced in the starting operation of the tank may be withdrawn from each of said plurality of containers with a minimum of glass loss from the tank as a whole.

7. The method of melting glass in a tank having a plurality of containers for glass-forming material in the floor thereof which comprises heating glass-forming materials in the containers to a temperature at which it is molten, submerging electrodes in the molten mass, passing a current of electricity therethrough, adding additional glass-forming material to the tank to connect the masses in the containers with one another and to raise the glass in the tank to an operative level, heating the additional material by passing a current of electricity between the electrodes, and adjusting the height of the electrodes to regulate the path of travel of electricity through the glass.

8. The method of commencing the operation of a glass melting tank which comprises raising the temperature of small bodies of glass-forming materials to a point at which the materials form a fluid mass, submerging electrodes in each mass, passing a current of electricity between the electrodes in each mass, and while maintaining the electrodes submerged adding additional glass-forming material to inter-connect the small bodies of glass and raise the glass in the tank to an operative level.

9. The method of melting glass which comprises establishing within a tank a relatively small pool of molten glass, thereafter submerging spaced electrodes within the pool, passing a current of electricity between the electrodes and through the glass, adding glass-making materials to the pool, and melting the same by means of the current passed between said electrodes.

Signed at Hartford, Connecticut this 2nd day of May, 1930.

HAROLD A. WADMAN.